Figure 1:
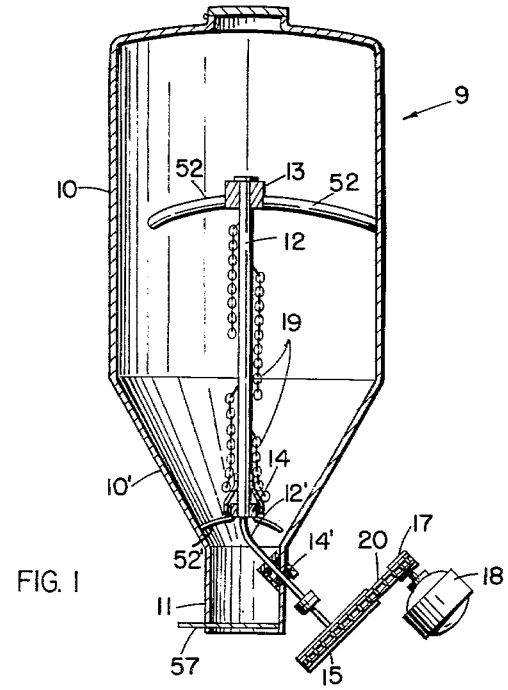

Dec. 14, 1965    L. A. SCHULD    3,223,290
BOTTOM DISCHARGE CONTAINER WITH AGITATOR
Filed Dec. 23, 1963    4 Sheets-Sheet 1

INVENTOR.
LEO A. SCHULD

BY H. Keith Schoff
ATTORNEY

INVENTOR.
LEO ALOIS SCHULD

BY *[signature]*
ATTORNEY

Dec. 14, 1965 L. A. SCHULD 3,223,290
BOTTOM DISCHARGE CONTAINER WITH AGITATOR
Filed Dec. 23, 1963 4 Sheets-Sheet 4

INVENTOR.
LEO ALOIS SCHULD
BY
ATTORNEY

United States Patent Office 3,223,290
Patented Dec. 14, 1965

3,223,290
BOTTOM DISCHARGE CONTAINER WITH AGITATOR
Leo Alois Schuld, Rte. 4, Mosinee, Wis.
Filed Dec. 23, 1963, Ser. No. 333,798
9 Claims. (Cl. 222—228)

This application is a continuation-in-part of my application Serial No. 71,620, filed November 25, 1960 entitled "Bulk Material Container," and now abandoned.

This invention relates to bulk material containers, and more particularly relates to bottom-discharge hoppers which are provided with agitator means that enable the contents of the hopper to be free flowing and easily discharged.

Bulk materials are conveniently stored prior to packaging or use in elevated hoppers from which they are drawn as needed. The contents of a hopper can be discharged by gravity flow through a bottom valve-controlled opening in the hopper. The storage of bulk materials in hoppers is convenient and economical if the materials remain in a free-flowing state during storage and do not become caked or compacted in a way which prevents them from being easily discharged from the hopper. Materials such as hygroscopic minerals, finely comminuted absorbent materials and grains which are mixed with viscous liquids to provide livestock feed are discharged from hoppers only with difficulty after long storage. The article of this invention provides a means for agitating and loosening bulk materials stored in hoppers so that the materials flow freely through the discharge outlets of the hoppers.

The article of this invention provides a rotating shaft to which a plurality of chains are affixed so that the chains are thrown outward by centrifugal force when the shaft is rotated. The shaft is disposed within a hopper and the chains loosen the material stored in the hopper when they are swung outward, by rotation of the shaft, thereby breaking up and loosening caked bulk materials sufficiently at the discharge outlet so that the material in the hopper is free-flowing.

It is an object of this invention to provide a self-clearing hopper for storing bulk materials.

It is another object of this invention to provide a means for breaking up cakes of material and for loosening compacted material in bulk storage hoppers.

It is another object of this invention to provide a hopper for containing bulk materials in which a rotatable shaft with a plurality of free-swinging chains is provided.

Figure 3:
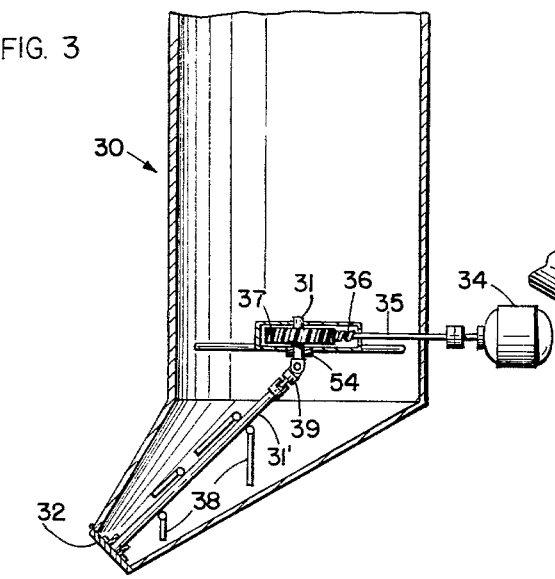
Figure 4:
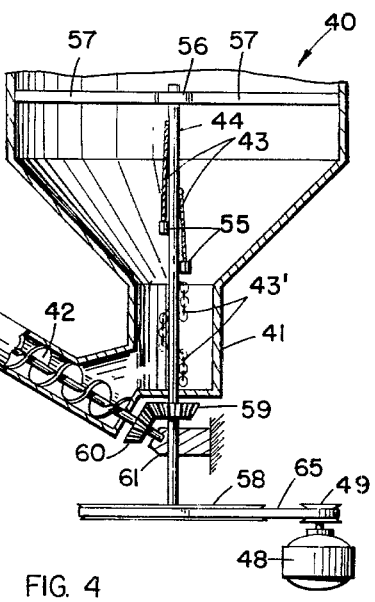
Figure 2:
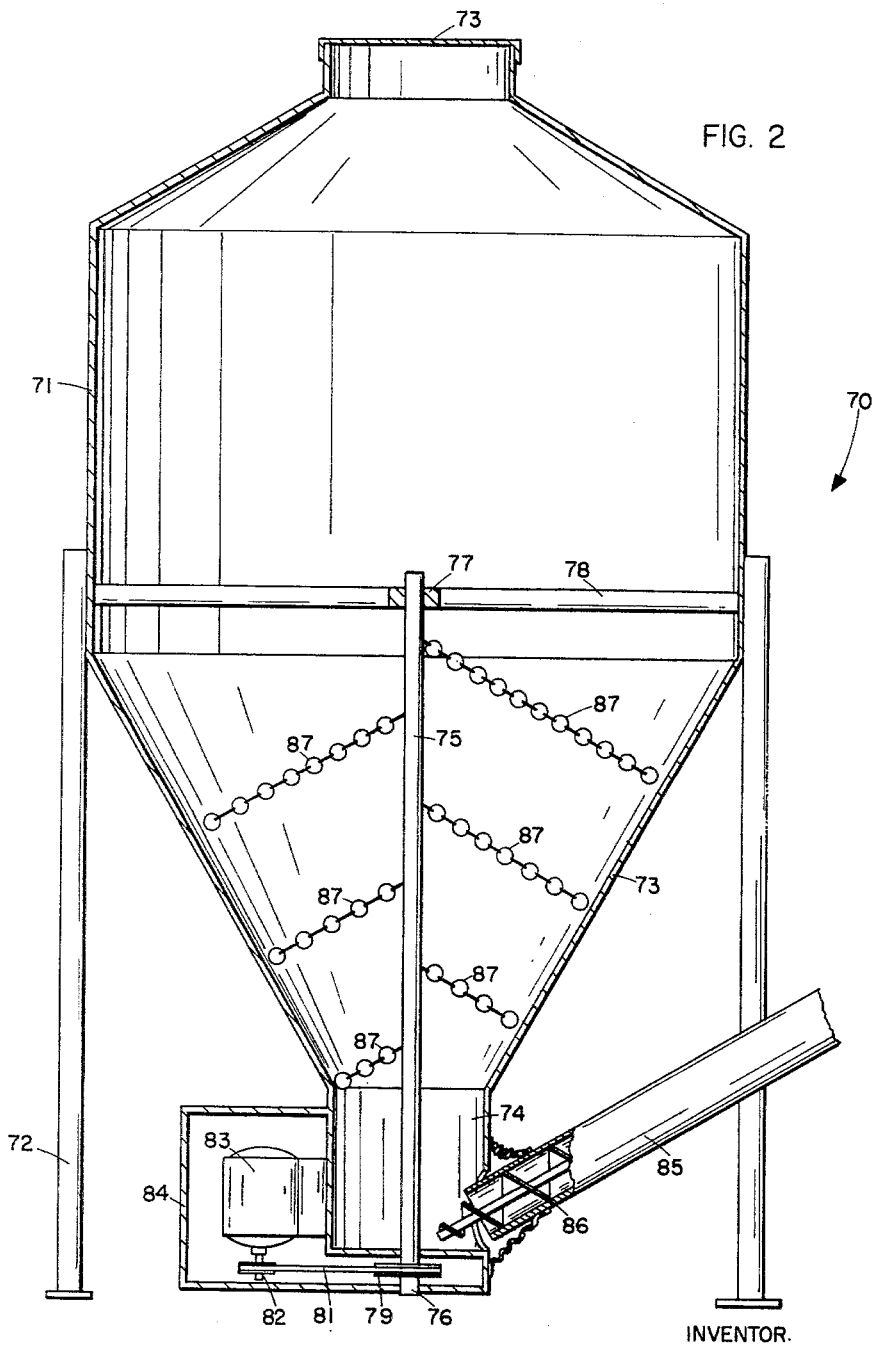
Figure 5:
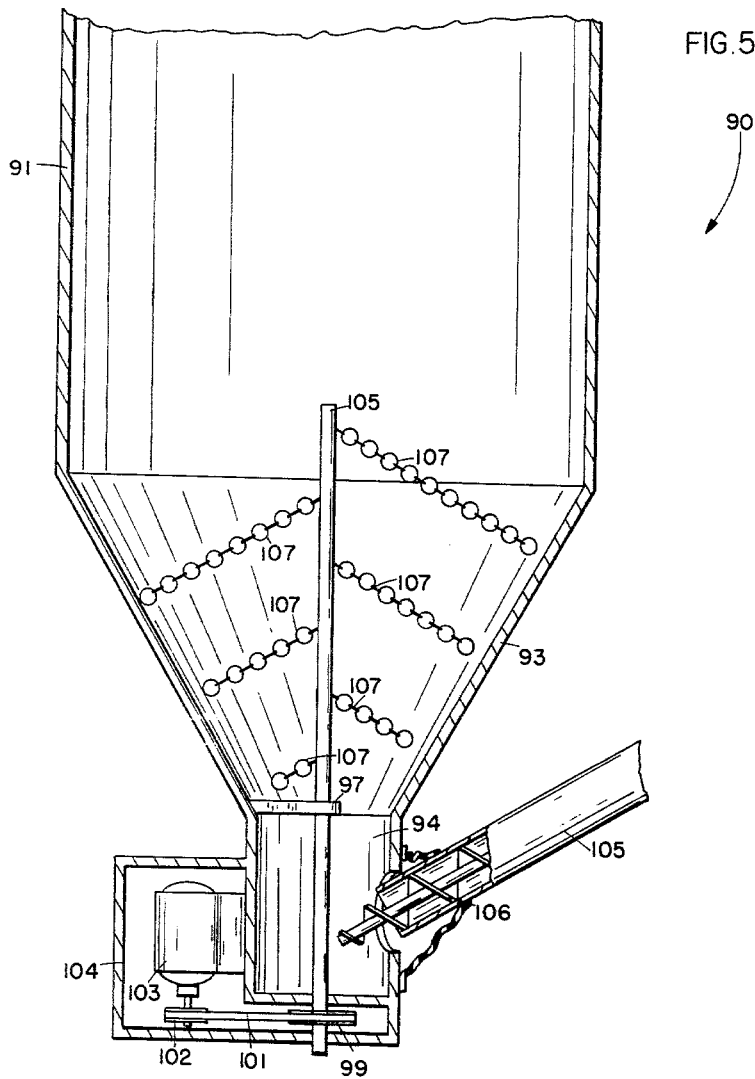
Figure 6:
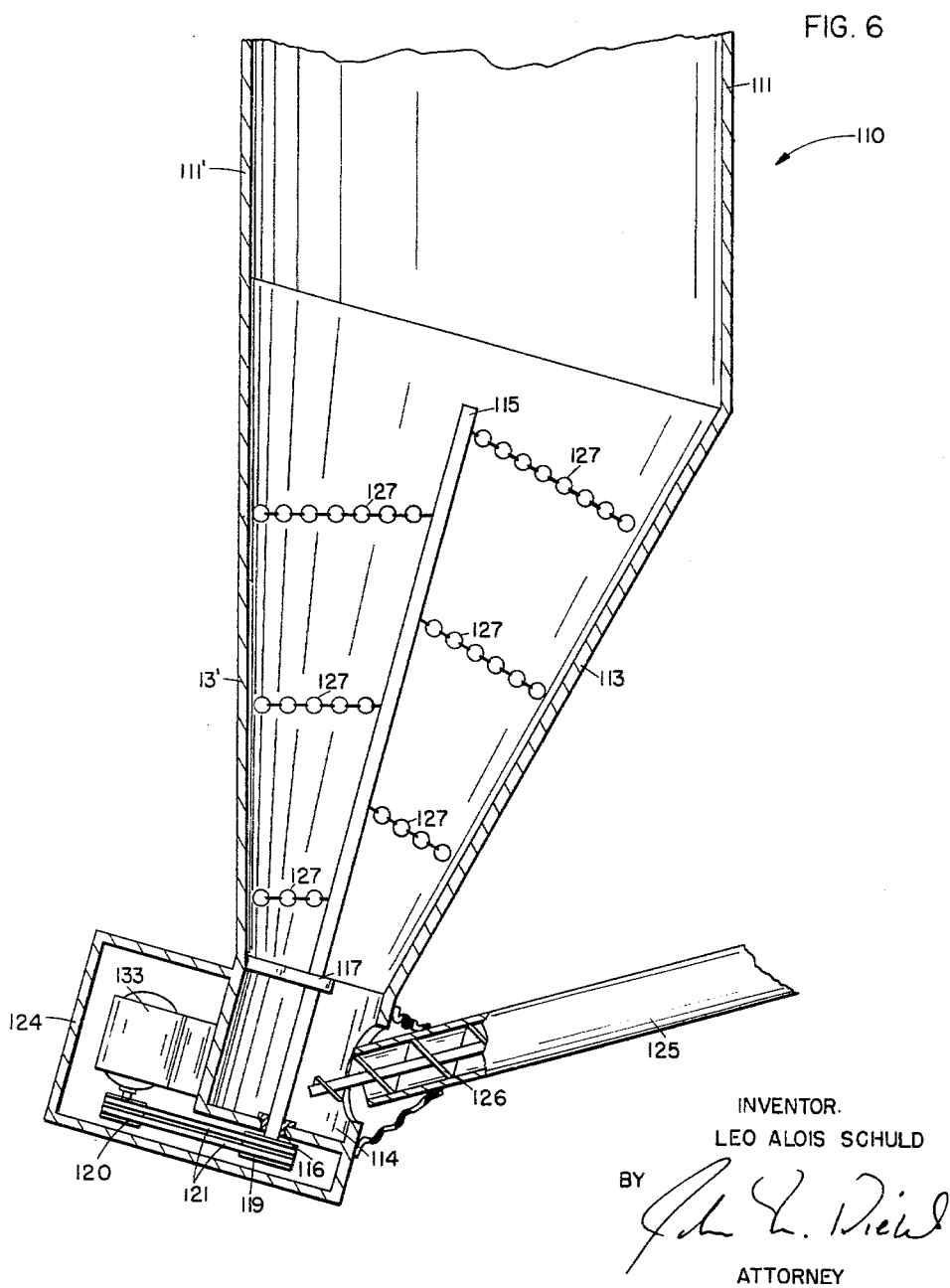

Other objects will become apparent from the drawings and from the following detailed description in which it is intended to illustrate the applicability of the invention without thereby limiting its scope to less than that of all equivalents which will be apparent to one skilled in the art. In the drawings like reference numerals refer to like parts and:

FIGURE 1 is a cross-sectional elevation of a self-clearing hopper of this invention;
FIGURE 2 is a cross-sectional elevation of another embodiment of this invention;
FIGURE 3 is a cross-sectional elevation of another embodiment of this invention;
FIGURE 4 is a cross-sectional elevation of another embodiment of this invention;
FIGURE 5 is a cross-sectional elevation of another embodiment of this invention;
FIGURE 6 is a cross-sectional elevation of still another embodiment of the invention.

In FIGURE 1 is shown hopper 9 comprising upper cylindrical portion 10 and lower cylindrical discharge outlet 11 with conical portion 10' disposed intermediate the upper and lower portions in a manner which enables materials in the hopper to move by gravity flow to the discharge outlet 11. The hopper is of conventional configuration and may be of any desired size; hoppers of from 5 feet to 25 feet diameter are convenient for many applications. Discharge outlet 11 is provided with valve means 57 which comprises a slidable plate or a valve of other conventional configuration and which may be operated manually, mechanically, or by automatic control means. Slightly above valve means 57 are disposed the lower end extremity of shaft 12, bearing means 14, pulley 15 fixedly attached to shaft 12, and a portion of flexible shaft 12'. Shaft 12 is rotatively supported against thrust and radial loads by bearings 13 and 14 within hopper 9. Rotatable flexible shaft 12' is fixedly coupled to the lower extremity of shaft 12 and provides a drive means therefor. Flexible shaft 12' may comprise any operable construction such as a helically coiled wire embedded in resilient material or other construction which is operable for transferring torque through a small angle. Flexible couplings or universal joints might also be used. Shaft 12' is mounted on bearing 14' and is coupled to shaft 12 adjacent bearing 14. Bearings 14, 14', and 13 comprise either friction or anti-friction bearings which operably withstand thrust and radial loading. It is desirable that a flexible foldable film or fabric material be placed around the bearings to prevent them from becoming dirty or clogged. It is also desirable that shafts 12 and 12' be as short as is practical to minimize stresses arising from vibration in the shafts and bearing during operation of motor 18. Bearings 13 and 14' are rigidly attached to hopper 9 by operable support members 52 and 52' and preferably comprise self-lubricating and sealed bearings of conventional design. However, lubricated friction and anti-friction bearings may be used if desired. A plurality of chains 19 are attached to shaft 12 by being welded or otherwise connected to the shaft. When shaft 12 is rotated the free ends of chains 19 are thrown outward by centrifugal force into contact with compacted material in the hopper in a manner which gouges and abrades the material thereby loosening it. Chains 19 are shorter than the inside radius of hopper 9 at the level at which they are attached so that they will not contact the sides of the hopper when the hopper is nearly empty. Electric motor 18 is rigidly mounted outside of hopper 9 and is provided with drive sprocket 17 with which drive chain 20 is meshed. Chain 20 drives driven sprocket 15 which is fixedly coupled to flexible shaft 12' in operable manner. An opening and bearing 14' is provided for passage and support of shaft 12' therethrough. Chain 20 can be replaced in other embodiments of the invention by a belt, and sprockets 15 and 17 can be replaced by pulleys which are operably connected by means of the belt. It is desirable to rotate shaft 12 at speeds of from 80 r.p.m. to 200 r.p.m., and a multiple pole electric induction motor may be operably used without gear reduction means to drive shaft 12. The reduction between sprockets 15 and 17 is usually not greater than 10:1.

In operation, hopper 9 may be filled to any level with material stored therein and when it is desired to withdraw material from hopper 9 valve 57 is opened and motor 18 is started so that shaft 12' and shaft 12 to which shaft 12' is fixedly coupled are operably rotated and chains 19 are swung outward into substantially horizontal positions in response to centrifugal force and pass through the material stored in hopper 9 thereby loosening the stored material and enabling it to flow freely from outlet 11 at the bottom of the hopper. Chains 19 may be affixed to shaft 12 by any operable means, such as by welding or by swivel means or by any other operable means. Chains 19 may overlap, as shown, without becoming tangled and inoperable. Chains 19 refer generically to any elongated flexible or pivotally mounted members, however, metal chains provided with sharpened edges if possible are preferred for use in the apparatus of this invention because they are self-untangling when shaft 12 is stopped if they have become crossed during operation. The size and weight of chains 19 will be determined in part by the density of the material which is stored in hopper 9, however, link chains are preferred and may be of any operable size from those comprising wire links to those which are forged from ½ inch diameter or larger steel stock. Motor 18 may be electric motor means as shown or may be any other prime mover. A high-starting torque motor is not necessary because chains 19 hang loosely beside shaft 12 between operations and do not provide high resistance to turning of shaft 12. For a hopper 10 feet in diameter a single phase induction motor of one-half horsepower rating with a 10:1 reduction between motor speed and the speed of shaft 12 is operable for many bulk materials, such as grain feeds and the like.

In FIGURE 3 is shown another embodiment of this invention wherein side-outlet hopper 30 is provided and wherein jointed shaft 31' is provided for operably clearing hopper 30 so that material operably flows to discharge outlet 32. Roller bearing 54 may operably resist radial and thrust loadings. Motor 34 is provided with drive shaft 35 extending through the wall of hopper 30 with worm 36 affixed to the inner end of the shaft. Worm 36 operably meshes with gear 37 on shaft 31 thereby causing shaft 31 to be rotated and causing pivotally affixed rods 38 on shaft 31' to swing outward by centrifugal force to contact and loosen material within hopper 30 in the manner heretofore described. Universal joint 39 connects shaft 31 with shaft 31' thereby enabling rods 38 to be operably disposed in near adjacency to discharge outlet 32. Bearing 53 is provided on shaft 31' adjacent outlet 32. Rods 38 may comprise solid metal bars connected to shaft 31 in a manner which enables unrestricted radial movement thereon, or may comprise metal cable or metal wire with weights attached to the free end extremities thereof, or when low-density bulk materials are being stored rods 38 may comprise natural or synthetic fibrous ropes.

In FIGURE 4 is shown another embodiment of the invention wherein hopper 40 is terminated at its lower extremity by cylindrical discharge outlet 41. Screw conveyor 42 is provided to transfer materials from outlet 41 to any higher elevation as may be desired. Screw conveyor 42 may be of any well known configuration. Ropes 43 are attached to shaft 44 and are provided with weights 55 such as pipe sections at the end extremities. When shaft 44 is rotated ropes 43 are thrown outward centrifugally within hopper 40 in operable manner. Chain 43' is affixed to the lower end extremity of shaft 44 and provides a means for preventing the lowermost portion of hopper 40 from becoming clogged. Motor 48 is the prime mover for conveyor 42 and for shaft 44. The drive mechanism from motor 48 comprises drive pulley 49 on motor 48, belt 65, and pulley 58 affixed to shaft 44. Bevel gear 59 is affixed to shaft 44 and drives bevel gear 60 affixed to conveyer 42. Thrust loads on conveyor 42 and shaft 44 are transferred to bearing 61 which is rigidly affixed with respect to the hopper. Shaft 44 may be held in place at its upper end by bearing 56 which may be supported by members 57 which extend from interior walls of hopper 40. Other operable drive mechanisms may be used in the embodiments of this invention as will be obvious to one skilled in the art.

It is to be understood that this invention provides hinged members on a rotatable shaft within a bulk storage enclosure which are caused to pass through the volume of the enclosure and agitate and loosen compacted material within the enclosure.

Referring now to FIGURE 2, there is shown a bulk tank indicated generally as 70 comprising upper cylindrical portion 71 supported by legs 72 having a manhole with closure 43 at the top. The lower portion of tank 70 is an inwardly and downwardly tapering portion 73 which extends downwardly to a lower cylindrical portion 74. Shaft 75 is rotatably mounted, extending vertically on the axis of portions 73 and 71, being rotatably mounted on bearings 76 and 77. Bearing 77 is supported by members 78 which extend inwardly from interior walls of portion 71. Fixedly attached to shaft 75 near its bottom end there may be provided sheave 79 which may have trained over it belt 81 which may also be trained over sheave 82, mounted on driving shaft extending from motor 83, all of which may be contained within housing 84. By operation of motor 83, shaft 75 may thus be rotatably driven by means of belt 81 and trained over the sheaves. Extending into portion 74 and adapted to remove material therefrom through tube 85 there may be provided auger 86 which may be driven by means which for simplicity are not shown. Attached to shaft 75 there are provided a plurality of chains 87, each of which is affixed only at its upper end extremity to the shaft, each of which is disposed at a different height on the shaft and each of which is longer than the chain attached next below it. The chains are shown in the position in which they extend when the shaft is rotated at a suitable speed.

Referring now to FIGURE 5, there is shown another embodiment wherein a bin indicated generally as 90 may comprise upper cylindrical portion 91 of relatively great diameter, only the lower portion of which is shown, and lower tapering portion 93 which tapers inwardly and downwardly to a lower receiving portion 94, which may, if desired, be cylindrical as shown. The tank 90 may be supported by any suitable means which, for simplicity, is not shown. Mounted on the axis of portion 93 and extending upwardly, there is provided rotatable shaft 95 which is rotatably mounted in bearings 96 and 97 which are attached by suitable means as shown to portions of the housing surrounding receiving portion 94. Sheave 99 may be provided fixedly attached to an extending portion of shaft 95 and motor 103 may be provided with sheave 102 fixedly attached to its shaft. Belts 101 may be trained over sheaves 102 and 99 so that operation of motor 103 may cause shaft 95 to be suitably rotated. The motor, sheaves and belts may be suitably enclosed within housing 104. Auger 106 may extend into portion 94 to remove material therefrom, through tube 105 and may be driven by means which for simplicity are not shown. Attached to shaft 95, there are provided a plurality of flexible members, preferably chains 107, which have the characteristics described in connection with chains 87.

It may thus be observed that shaft 75 and shaft 95 and chains 87 and 107 respectively attached thereto are located substantially entirely within the lower downwardly and inwardly tapering portion of the tank of each embodiment respectively and substantially all of the chain members attached to the shaft are disposed to rotate within the said lower inwardly tapering section. In FIGURE 5, chains 107 are shown in the position they occupy when no material is contained in portion 93 and shaft 95 is rotated at a suitable speed.

Referring now to FIGURE 6, there is shown another embodiment wherein the tank indicated generally as 110 comprises upper cylindrical portion 111 of relatively great uniform diameter and lower downwardly, inwardly tapering portion 113 which tapers downwardly to an outlet into lower receiving portion 114 (which may suitably be a cylindrical portion) having a much smaller diameter than the diameter of portion 111. Tank 110 may be suitably supported by means which, for simplicity, are not shown. Portion 113 as shown extends sidewardly, and is preferably conical in shape. It may suitably extend to one side to such an extent that one element of its side as indicated at 113' is co-extensive with one element of the cylindrical wall portion 111 as indicated at 111'.

Preferably portion 113 is symmetrical about an axis which extends at an angle to the axis of cylindrical portion 111. On the axis of portion 113 or near said axis there is provided a shaft 115 extending upwards at an angle to the vertical and at an angle to the axis of portion 111. Shaft 115 is preferably supported in the manner of a cantilever by being rotatably mounted in bearings 116 and 117 which are preferably supported in place by being suitably attached as shown to portions of the housing which defines receiving portion 114. Attached to an extending portion of 115 which extends through bearing 116 and beyond said housing of portion 114 there may be provided sheave 119. Also attached by suitable means to said housing there may be provided motor 123 and on the downwardly extending shaft of motor 123 there may be fixedly mounted sheave 122. Trained over sheaves 119 and 122 there may be provided a plurality of belts 121 by means of which shaft 115 may be rotatably driven by operation of motor 123. Housing 124 may be suitably provided around the motor, sheaves and shafts to protect them from the weather. Extending downwardly into space 114 there may be provided auger 126 which may be adapted to move material contained in portion 114 upwardly through tube 125. Auger 126 may be driven by means which for simplicity are not shown. Attached to shaft 115 there may be provided flexible members 217, preferably chains with sharp edges, which may have all the characteristics in relation to portion 113, shaft 115 and to each other, as hereinbefore described with respect to chains 107 and chains 87.

Thus, it may be seen that in all preferred embodiments the following characteristics are present:

(1) The members which extend from the central rotatable shaft are:
  (a) non-rigid
  (b) substantially uniform
  (c) each affixed at only its upper end extremity to said shaft
  (d) each disposed at a different height on the shaft
  (e) each longer than the one below it.

(2) Each one is shorter than the distance from its point of attachment to the shaft to the enclosure in which it is located when it extends outward in response to centrifugal force.

Also it may be noted that in all preferred embodiments the upwardly extending rotatable shaft is disposed primarily substantially entirely only within the lower downwardly tapering section, and all, or substantially all, of the members which extend from the central rotatable shaft are disposed to extend outward under centrifugal force substantially entirely only within said tapering section. Said shaft is preferably central with respect to the tapering section but not necessarily with respect to the cylindrical portion above the tapering portion. The central shaft is preferably devoid of auger blades thereon which act to force the material downward and preferably does not extend upwardly through or very far into said cylindrical section. It especially does not extend out the top of the tank.

While certain modifications and embodiments of the invention have been described, it is of course to be understood that there are a great number of variations which will suggest themselves to anyone familiar with the subject matter thereof and it is to be distinctly understood that this invention should not be limited except by such limitations as are clearly imposed in the appended claims.

I claim:

1. A device for use within a bulk storage hopper for loosening materials stored in said hopper comprising in combination a rotatable shaft within said hopper, drive means for rotating said shaft, a plurality of non-rigid substantially uniform elongated members each affixed at only its upper end extremity to said shaft, said elongated members each being disposed at a different height on said shaft and being enabled to swing outwardly and upwardly in response to centrifugal force when said shaft is rotated, each member being longer than the member attached to the shaft below it, said members disposed to extend outward in response to centrifugal force when said shaft is rotated, and to depend downward when said shaft is not rotated, each of said elongated members being slightly shorter than the distance from said shaft to the sides of said enclosure at the elevation at which each of said members is affixed to said shaft, said elongated members causing bulk materials to become free flowing and non-compacted when passed therethrough in bulk storage hopper, wherein said hopper comprises an upper cylindrical portion having a relatively great uniform diameter and a lower portion tapering inwardly and downwardly to a smaller diameter and wherein said members are located entirely within said tapering portion and said shaft extends substantially principally only in said tapering portion, and wherein said shaft is devoid of auger blades and extends only within said tapering portion, and wherein said tapering portion extends as a cone having an axis which is at an angle to the axis of the said cylindrical portion so that said tapering portion extends downwardly and to one side.

2. The article of claim 1 wherein said shaft is supported as a cantilever member from two relatively closely spaced apart bearings near the bottom of said tapering portion.

3. A bulk material storage hopper and means to loosen materials stored therein comprising in combination an enclosure for containing bulk materials, a discharge outlet adajcent the lower extremity of said enclosure, a rotatable shaft disposed within said enclosure, drive means for rotating said shaft, a plurality of non-rigid sustantially uniform elongated members each affixed to said shaft at a different height on said shaft, each of said elongated members being attached to said shaft only at its upper end extremity, each member being longer than the member attached to the shaft below it, said members disposed to extend outward in response to centrifugal force when said shaft is rotated, and to depend downward when said shaft is not rotated, each of said elongated members being slightly shorter than the distance from said shaft to the sides of said enclosure at the elevation at which each of said elongated members is affixed to said shaft, wherein said hopper comprises an upper cylindrical portion having a relatively great uniform diameter and a lower portion tapering inwardly and downwardly to a smaller diameter and wherein said members are located entirely within said tapering portion and said shaft extends substantially principally only in said tapering position, and wherein said shaft is devoid of auger blades and extends only within said tapering portion, and wherein said tapering portion extends as a cone having an axis which is at an angle to the axis of the said cylindrical portion so that said tapering portion extends downwardly and to one side.

4. The article of claim 3, wherein said shaft is supported as a cantilever member from two relatively closely spaced apart bearings near the bottom of said tapering portion.

5. A self-clearing hopper comprising in combination an enclosure having an upper cylindrical portion of relatively great uniform diameter, a lower portion of said enclosure tapering downwradly to a smaller diameter, a shaft disposed within said enclosure, said shaft being rotatable within said enclosure, a plurality of non-rigid substantially uniform elongated members each affixed to said shaft at a different height thereon, said members being disposed principally within said tapering portion of said enclosure, each of said members being attached to said shaft only at its upper end extremity, each member being longer than the member attached to the shaft below it, said members disposed to extend outward in response to centrifugal force when said shaft is rotated, and to depend downward when said shaft is not rotated, each of said elongated members being slightly shorter than the distance from said shaft to the sides of said enclosure at the elevation at which each of said elongated members is affixed ot said shaft, means for rotating said shaft, means for controlling outflow of bulk materials from said enclosure, wherein said shaft is devoid of auger blades and extends only within said tapering portion, and wherein said tapering portion extends as a cone having an axis which is at an angle to the axis of the said cylindrical portion so that said tapering portion extends downwardly and to one side.

6. The article of claim 5 wherein said shaft is supported as a cantilever member from two relatively closely spaced apart bearings near the bottom of said tapering portion.

7. A device for use within a bulk storage hopper for loosening materials stored in said hopper comprising in combination a rotatable shaft within said hopper, drive means for rotating said shaft, a plurality of non-rigid substantially uniform elongated members each affixed at only its upper end extremity to said shaft, said elongated members each being disposed at a different height on said shaft and being enabled to swing outwardly and upwardly in response to centrifugal force when said shaft is rotated, each member being longer than the member attached to the shaft below it, said members disposed to extend outward in response to centrifugal force when said shaft is rotated, and to depend downward when said shaft is not rotated, each of said elongated members being slightly shorter than the distance from said shaft to the sides of said enclosure at the elevation at which each of said elongated members is affixed to said shaft, said elongated members causing bulk materials to become free flowing and non-compacted when passed therethrough in a bulk storage hopper, wherein said hopper comprises an upper cylindrical portion having a relatively great uniform diameter and a lower portion tapering inwardly and downwardly to a smaller diameter and wherein said members are located entirely within said tapering portion and said shaft extends substantially principally only in said tapering portion, and wherein said shaft is devoid of auger blades and extends only within said tapering portion, and wherein said tapering portion extends as a cone having an axis which is on a common axis with the axis of the said cylindrical portion so that said tapering portion extends directly downwardly and wherein said shaft is supported as a cantilever member from two relatively closely spaced apart bearings near the bottom of said tapering portion.

8. A bulk material storage hopper and means to loose materials stored therein comprising in combination an enclosure for containing bulk materials, a discharge outlet adjacent the lower extremity of said enclosure, a rotatable shaft disposed within said enclosure, drive means for rotating said shaft, a plurality of non-rigid substantially uniform elongated members each affixed to said shaft at a different height on said shaft, each of said elongated members being attached to said shaft only at its upper end extremity, each member being longer than the member attached to the shaft below it, said members disposed to extend outward in response to centrifugal force when said shaft is rotated and to depend downward when said shaft is not rotated, each of said elongated members being slightly shorter than the distance from said shaft to the sides of said enclosure at the elevation at which each of said elongated members is affixed to said shaft, wherein said hopper comprises an upper cylindrical portion having a relatively great uniform diameter and a lower portion tapering inwardly and downwardly to a smaller diameter and wherein said members are located entirely within said tapering portion and said shaft extends substantially principally only in said tapering position, and wherein said shaft is devoid of auger blades and extends only within said tapering portion, and wherein said tapering portion extends as a cone having an axis which is common to the axis of the said cylindrical portion so that said tapering portion extends directly downwardly and wherein said shaft is supported as a cantilever member from two relatively closely spaced apart bearings near the bottom of said tapering portion.

9. A self-clearing hopper comprising in combination an enclosure having an upper cylindrical portion of relatively great uniform diameter, a lower portion of said enclosure tapering downwardly to a smaller diameter, a shaft disposed within said enclosure, said shaft being rotatable within said enclosure, a plurality of non-rigid substantially uniform elongated members each affixed to said shaft at a different height thereon, said members being disposed principally within said tapering portion of said enclosure, each of said members being attached to said shaft only at its upper end extremity, each member being longer than the members attached to the shaft below it, said members disposed to extend outward in response to centrifugal force when said shaft is rotated, and to depend downward when said shaft is not rotated, each of said elongated members being slightly shorter than the distance from said shaft to the sides of said enclosure at the elevation at which each of said elongated members is affixed to said shaft, means for rotating said shaft, means for controlling outflow of bulk materials from said enclosure, wherein said shaft is devoid of auger blades and extends only within said tapering portion, and wherein said tapering portion extends as a cone having an axis which is common to the axis of the said cylindrical portion so that said tapering portion extends directly downwardly and wherein said shaft is supported as a cantilever member from two relatively closely spaced apart bearings near the bottom of said tapering portion.

References Cited by the Examiner
UNITED STATES PATENTS

| | | | |
|---|---|---|---|
| 2,228,421 | 1/1941 | Taylor | 222—228 |
| 3,037,713 | 6/1962 | Carroll | 222—228 X |
| 3,066,831 | 12/1962 | Thompson | 222—239 X |

LOUIS J. DEMBO, *Primary Examiner.*